Sept. 25, 1956 W. L. GARFIELD 2,764,754

ELECTRICAL REMOTE CONTROL AND SUPERVISORY SYSTEMS

Filed July 21, 1951 2 Sheets-Sheet 1

Inventor
WILLIAM L. GARFIELD
By R. A. Morris
Attorney.

Inventor
WILLIAM L. GARFIELD
By [signature]
Attorney

Patented Sept. 25, 1956

2,764,754

ELECTRICAL REMOTE CONTROL AND SUPERVISORY SYSTEMS

William Littery Garfield, London, England, assignor to International Standard Electric Corporation, New York, N. Y., a corporation of Delaware Application July 21, 1951, Serial No. 237,853

Claims priority, application Great Britain July 24, 1950

3 Claims. (Cl. 343—6)

Figure 1:
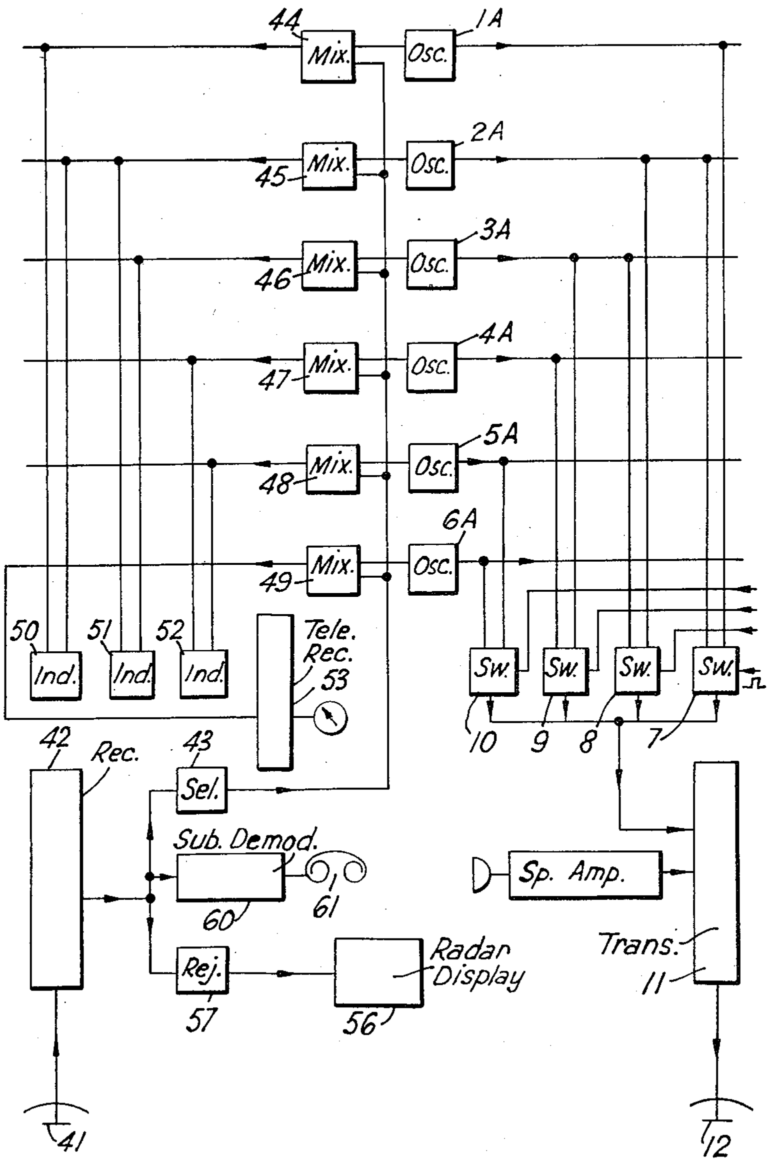

This invention relates to electrical signalling systems comprising remote control and supervisory arrangements. More particularly, it relates to systems of the type in which control and supervisory information is conveyed between a master station and a remotely located slave station by means of signals distinctively characterised in respect to their frequency content according to the information they carry.

It is a main object of the present invention to provide a system of the above type in which the number and variety of circuit components is relatively small having regard to the number of different kinds of information to be handled.

Another object of the invention is to provide an electrical signalling system comprising a radar station which is remotely controlled and supervised over a radio link from a master station at which the object-position information furnished by the radar station is displaced.

According to one general feature of the invention there is provided an electrical remote control and supervisory system comprising a master station and a slave station adapted for linkage by signal transmission means, said stations together comprising an even plurality (greater than 2) of oscillators of different distinguishing frequencies and operative in pairs, each pair having the same frequency difference, one oscillator of each said pair being located at said master station and the other at said slave station, each of said oscillators serving both as a source of signal energy to be transmitted and as a beating oscillator for signal energy received from its paired oscillator.

According to another general feature of the invention there is provided an electrical remote control and supervisory system comprising a master station and a slave station adapted for linkage by signal transmission means, said master station comprising means for originating pulses representing a required control operation at said slave station, means for converting said originated pulses into pulses of high frequency energy distinguishably characterised according to the represented operation, and means for transmitting said converter pulses, said slave station comprising means for receiving the transmitted converted pulses, means for separately selecting the received pulses in accordance with their distinguishing characterisations, means for converting the separated pulses into operating pulses, and means for applying said operating pulses to complete the energising circuits necessary for effecting said desired control operation.

According to still another feature of the invention there is provided an electrical remote control and supervisory system comprising a plurality of pairs of oscillators, the first oscillator of each pair being comprised in a master station and the second oscillator of each pair being comprised in a slave station, said oscillators having different respective frequencies and the oscillators of each pair differing in frequency by an amount the same for all pairs, said stations being adapted for linking by signal transmission means, one of said stations further comprising a plurality of switching devices each adapted to switch output energy from a number of said oscillators at said one station in response to a respective operating signal (control or supervisory), said switched output energy being distinctively characterised by its frequency-solvent, and means for applying said switched energy to said signal transmission means, said other station further comprising means for receiving the transmitted switched energy, a plurality of separately energised responding devices one per said switching device, mixer means jointly responsive to the received switched energy and to energy from said oscillators at said other station to produce a plurality of currents corresponding each to a respective one of said switched oscillators, and means responsive to said produced currents for selectively completing the energising circuits of said responsive devices.

From a more particular aspect, according to the invention there is provided an electrical remote control and supervisory system comprising a plurality of pairs of oscillators, the first oscillator of each pair being comprised in a master station and the second oscillator of each pair being comprised in a slave station, said oscillators having different respective frequencies and the oscillators of each pair differing in frequency by a given frequency the same for all pairs, said stations being adapted for linking by signal transmission means, said master station further comprising a plurality of master switching devices responsive to respective control signals originated at said master station to switch to said signal transmission means energy from selected said first oscillators, said switched energy having a different characterising frequency-content for each of said master control devices, and said slave station further comprising means for receiving said switched energy, a plurality of separately energised slave control devices corresponding each to a respective said master switching device, mixer means responsive jointly to said received switched energy, and to energy from said second oscillators to produce therefrom a number of separate slave currents corresponding each to a respective one of said selected first oscillators, and relay means responsive to said derived slave currents for selectively completing the energising circuits of said slave control devices. Such a system may further comprise at said slave station a number of supervisory switching devices, responsive to respective supervisory signals originated at the slave station and each adapted to switch output energy from a number of selected second oscillators such that the switched second oscillator energy has a different frequency-content for each of the supervisory switches, this switched energy being transmitted to the master station and therein beaten against energy from the first oscillators to produce currents which are applied to control supervisory indicators. Telemeter signals may also be transmitted from the slave station in the form of second oscillator keyed at a rate which is governed by the magnitude of the quantity to be telemetered. In the case of the slave station including radar equipment, the radar display pulses may be transmitted to the master station, for application to display equipment located thereat, the transmission of the radar display pulses taking place alternately with transmission of supervisory and/or telemeter signals.

Figure 2:
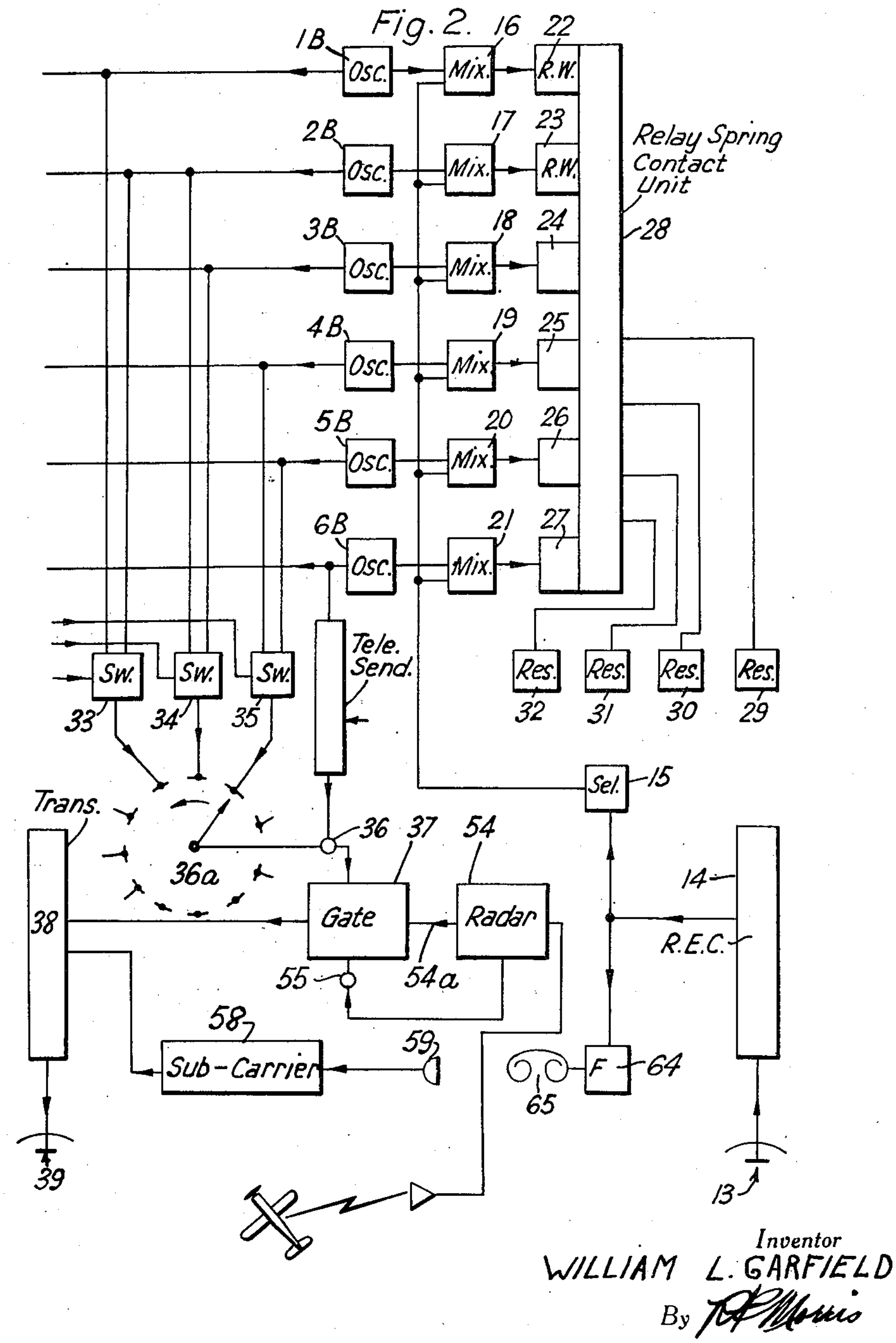

A better understanding of the invention will be obtained from the following description of a specific embodiment, illustrated by the accompanying drawings in which:

Fig. 1 illustrates that part of the control and supervisory system which is located at the master (or controlling) station of a remotely operated radar installation, and Fig. 2 illustrates that part of the system which is located at the slave (or controlled) station.

The embodiment now to be described resides in a radar observational system of the type frequently referred to as a "ground control approach" system. Such an airport system comprises a radar equipment arranged to detect approaching aircraft and to display on an indicator, usually of the cathode ray oscillograph type, information as to their distances and their bearings in azimuth and in elevation, which information is used by the airport controller in determining what landing instructions are to be given to the approaching aircraft. In order that the airport controller may obtain the required information with the maximum speed it is obviously desirable that the display of the indication and the control of the radar equipment are carried out in his office i. e. in the airport control tower; the radar equipment itself however, is usually necessarily positioned on the airfield, at a distance of perhaps several miles from the control tower. The present invention here provides a remote control system which acting in one direction provides facilities for complete control of the radar equipment from the control tower, and which acting in the other direction provides facilities for the actuation of supervisory lamps etc. at the control tower in accordance with the settings of the various radar controls, in addition to providing for relaying the radar pulse signals for display at the control tower.

Referring now to the drawings, Figures 1 and 2 conjointly illustrate an embodiment of the control and supervisory system, Fig. 1 illustrating in block-diagram form the essential elements of the master station i. e. that part of the system which is located adjacent the control and display equipment at the airport control tower, while Fig. 2 similarly illustrates that part of the system which is comprised in the remotely located slave station i. e. adjacent the radar equipment.

As shown in Fig. 1, the master station comprises a group of six oscillators indicated at 1A, 2A, 3A, 4A, 5A and 6A. Each of these oscillators forms one of a system-pair of oscillators, the other of the pair being located at the slave station as indicated on Fig. 2 at 1B, 2B, 3B, 4B, 5B and 6B. As will be more fully explained hereinafter each of these paired oscillators, no matter whether it is located at the master or at the slave station, has a double function; (*a*) it serves as a source of signalling "tone," and (*b*) it serves as a beating oscillator to beat with the tone signals received from the other oscillator of the pair. The oscillators of each pair differ from each other in frequency by the same given amount for all pairs, this given amount being in the present instance 1 kc./s. At the master station (Fig. 1) the oscillators 1A . . . 6A have different respective frequencies which increase progressively in 10 kc./s. steps from 100 kc./s. for oscillator 1A to 150 kc./s. for oscillator 6A, so that any beats between the outputs of unpaired oscillators are of frequency large relative to the already-mentioned given frequency difference of 1 kc./s. between the oscillators of a pair. At the slave station the oscillators have respective frequencies 1 kc./s. different from the frequencies of the corresponding paired oscillators at the master stations, their actual values increasing progressively in 10 kc./s. steps from 101 kc./s. for oscillator 1B to 151 kc./s. for oscillator 6B.

Returning to Figure 1, the master station also comprises a plurality of master switching devices, four of which are indicated at 7, 8, 9 and 10. Each of these master switching devices is coupled to two of the oscillators 1A . . . 6A and is responsive to operation of a respective master control device (not shown) corresponding to an operating or slave control device in the remote equipment. For example, master switching device 7 may be responsive to depression of a "start" button at the master station, this button corresponding to completion of the circuit of a starting contactor on the remote (radar) equipment; master switching device 8 may be responsive to a predetermined amount of rotation of a "potentiometer" knob at the master station, this knob corresponding to the shaft of a rotary potentiometer on the remote equipment; and similarly for the other switching devices. When one of the said master control devices is operated it applies an originating pulse to operate momentarily the responsive master switching device, the latter in turn allowing a complex pulse of energy from a particular two of the master station oscillators 1A . . . 6A to be switched to a signal transmission means 11 for transmission to the remote slave station. For example, operation of switching device 8 allows energy from oscillators 2A and 3A to be transmitted. In the present case, this transmission is effected by applying the switched energy to frequency-modulate a 5000 mc./s. radio-transmitter 11, the modulated output from which is radiated towards the slave station by a directive antenna system indicated at 12.

Each master switching device is thus responsive to operation of a respective master control device, and is adapted to switch output from two of the oscillators, so that there is transmitted a complex intermediate frequency wave characteristic of the operated master control device. While there are only six oscillator frequencies, there are available fifteen different combinations of two frequencies, which combinations may be used as distinctive complex waves each characteristic of the operation of a different one of fifteen master control devices.

Referring now to Fig. 2, at the slave station the frequency-modulated energy radiated from the master station is picked up on a directive receiving antenna system indicated at 13, and passed to receiver 14 in which it is amplified as necessary and then demodulated. The demodulated energy is then applied to a selector unit 15, which passes only those components of the receiver output which fall within the frequency-band occupied by the oscillators 1A . . . 6A of the master station, i. e. the present instance within the band 100 kc./s. to 150 kc./s. The output of this selector 15 is applied simultaneously to all of a group of six mixers 16, 17 . . . 21, each of which also receives input from a respective one of the six oscillators 1B, 2B . . . 6B, and has an output circuit arranged to select the component of 1 kc./s. beat frequency, the same as the already mentioned given amount of frequency difference between paired oscillators, e. g. the difference between the frequencies of oscillators 1A and 1B, or of 6A and 6B. Thus, operation of, for example switching device 8 of Fig. 1 results in transmission from the master station of a complex intermediate frequency wave comprising the frequencies of oscillators 2A and 3A, which complex wave is received at the slave station via the radio circuit and brings about, with the aid of oscillators 2B and 3B, the production of 1 kc./s. beat frequency signals in the output circuits of mixers 17 and 18; beat frequencies other than 1 kc./s. may be produced in the other mixers, but do not give rise to any effective signal in the output circuits which are all arranged to respond only to 1 kc./s.

Still referring to Fig. 2, the slave station further comprises a plurality of (six) relays, the respective windings or operating coils of which are indicated by blocks 22, 23 . . . 27. Each relay is arranged to operate in response to the setting up of 1 kc./s. beat frequency output in a respective one of the mixers 16 . . . 21. The sets of contact springs of these relays together form a relay spring contact unit indicated by block 28, the various contact springs being interconnected in such manner that simultaneous operation of any one of the fifteen possible combinations of two of the six relays completes the circuit for a respective one of up to fifteen separately energised remote (radar) equipment slave responding devices, four of which are indicated by blocks 29, 30, 31, 32. Taking the examples already quoted, depression of a "start" button at the master station (Fig. 1) results in master switching device 7 switching energy from oscillators 1A and 2A for transmission to the slave station; receipt of the transmitted energy at the slave station (Fig. 2) results in the production of 1 kc./s. beats in mixers 16 and 17, to operate relays 22 and 23, whereby relay contact unit 28 completes the circuit of a starting contactor (block 29). Similarly, the operation of master switching device 8 in response to rotation of a "potentiometer" knob at the master station results in the production at the slave station of 1 kc./s. beats in mixers 17 and 18, the outputs from which operate relays 23 and 24, whereby relay contact unit 28 completes a circuit (block 30) adapted to rotate the shaft of a potentiometer in the remote equipment. Other slave responding devices, up to a total of fifteen, can be set in action by different two-relay combinations arranged to respond to respective ones of the fifteen complex two-frequency waves which may be transmitted under control of the master switching devices at the master station.

Relay unit 28 may be any appropriate relay contact network configuration depending upon the circuits to be controlled and may conveniently comprise a "transfer tree" of the type described in the textbook "Design of Switching Circuits," by Keister, Ritchie and Washburn, (Van Nostrand, 1951) on page 116, Figs. 6–3 (A), et seq.

The various service control devices of the remote equipment are preferably arranged to be operated in known manner on a "lock-on, lock-off" basis. That is to say, to accomplish the switching on of a service, an appropriate momentary control signal consisting of a pulse of one of the complex waves is transmitted to the slave station, receipt of this signal resulting in the required service being switched on and locked i. e. remaining switched on. Such devices are well known in the art and are commonly known as flip-flop circuits, and have two conditions of stable equilibrium, either "on" or "off." To switch it off, a different control signal is transmitted, on receipt of which the service is unlocked. This system removes the necessity for having a number of control channels simultaneously active, since once any particular signal has been sent the system is free to transmit any other signal. This leads to a considerable reduction in complexity of the remote control system, with the limitation that only one control function at a time can be initiated. This limitation is, however, of little importance in view of the speed at which the system operates. Means may be provided for automatically cancelling any attempt to send more than one control signal at a time.

Remote control of rotatable devices, such as the potentiometer referred to previously, is accomplished in the following manner: Corresponding to the potentiometer to be adjusted, there is provided at the master station a control knob, rotation of which in one direction causes operation of one of the master switching devices, e. g. device 8, once for say every 30° of rotation, while rotation of the knob in the other direction causes operation of another master switching device, say device 9, once for every 30° of rotation. At the remote equipment the potentiometer itself is coupled to an "impulse motor," having a shaft running on two ball races and carrying two ratchet wheels having one hundred teeth per wheel (i. e. one tooth every 3.6°), the teeth on one of the wheels being oppositely directed to the teeth on the other wheel. On opposite sides of the shaft are mounted two electromagnet assemblies. Each assembly has a pivoted armature bearing on its end a spring pawl which, on energisation of the electromagnet, engages with a respective one of the ratchet wheels so as to step it round one tooth. One assembly is energised through an operating control device 30 in response to the signals transmitted under the control of master switching device 8, while the other assembly is energised by operating control device 31 in response to the signals transmitted under the control of master swithcing device 9. Thus the effect of rotating the control knob at the master station through a succession of 30° arcs in one direction or the other is to rotate the potentiometer itself through a succession of 3.6° arcs in the same direction as the control knob was rotated. If desired, a knob may be placed on the impulse motor shaft for local manual operation of the potentiometer, as the motor shaft is free to rotate when not actually being operated by the pawl and ratchet mechanism.

So far, we have considered only remote control in the sense that the operation of the remote equipment, in this case the radar equipment located on the airfield, is controlled by signals transmitted from the master station, in the present instance located at the control tower. There remains the problem of transmitting back from the controlled station supervisory signals giving information as to the state of the controlled equipment, for example, information as to whether or not particular switches have been closed, the amplitude of certain critical currents or voltages; and so on. In the present instance, there is also the requirement that the information collected by the radar equipment be transmitted to the control tower for display and utilisation. From this standpoint, the "slave" station of Fig. 2 is in effect a "master" station, while the "master" station of Fig. 1 becomes a "slave" station. In order to avoid confusing the description, however, the names "master station" and "slave station" will hereinafter still be applied to the apparatus of Fig. 1 and Fig. 2 respectively, despite the reversal in functioning to which attention has just been drawn.

So far as supervisory signals of the lamp-signal class are concerned, these are conveyed from the remote equipment to the master station in much the same manner as switching signals are conveyed in the reverse direction. Referring to Fig. 2, references 33, 34, and 35 indicate three of a plurality of up to ten supervisory switching devices, each of which devices is responsive to a respective supervisory signal originated at the salve station, and is adapted to switch output from a predetermined two of the five different-frequency oscillators 1B . . . 5B (oscillator 6B is reserved for telemetering function as hereinafter explained) in the same manner as the master station switching devices 7 . . . 10 of Fig. 1, each switching device delivering at its output terminals a complex two-frequency wave characteristic of the particular supervisory signal to which the device responds. The outputs of these switching devices are commutatively applied each in turn in repeated cyclical succession to a transmission system 36 through the electronic commutator switch indicated symbolically as **36*a*. This commutator switch in effect rotates at a relatively low speed, of the order of 1 c./s. and may conveniently consist of any known type of electronic commutator, such for instance, as that shown in U. S. Patent No. 2,217,774 to Skellett, or it may be of the mechanical type shown in U. S. Patent No. 2,523,-300 to Herbst. The output of commutator switch 36*a* is applied, in the present instance, through a gating switch 37 (the function of which is not directly connected with the supervisory system and will be explained hereinafter) to frequency-modulate the output of a radio-transmitter 38, the modulated output from which is radiated towards the master station by a directive antenna system indicated at 39. The gating switch 37 is of a type well known in the art and an example thereof may be found in the aforementioned tetxbook of Keister, Ritchie and Washburn, on page 214, Figs. 10–9. In order to assist in preventing interference between the control and the supervisory circuits, radio-transmitter 38 operates on a carrier frequency which is slightly different from that of the master station transmitter 11** (Fig. 1).

In the present embodiment of the invention the electronic commutator switch **36*a* comprises ten thermionic valves having in common a single anode output circuit which feeds to gating switch 37 via terminal 36**. The outputs of the slave station switching devices are applied each to a control grid of a respective one of these valves, which in the absence of gating bias are normally non-conducting. To render the valves conducting so that the inputs to the control grids may be transferred to the anode output circuit, gating bias is applied to each valve from a respective phase of a 10-phase pulse generator of known type. Each phase of this generator delivers square-wave pulses of repetition frequency 1 c./s. and of duration .1 second. The various valves of the commutator switch are thus separately rendered conducting in repeated regular succession for periods of .1 second, whereby the common anode circuit is effectively coupled for like periods to each in turn of the slave station switch-devices. Other methods of accomplishing the required commutative connection will readily occur to those skilled in the art; for example, a mechanical switch may be used if the required operating speed is sufficiently low.

For remote metering functions the principle of impulse telemetering is used. In the present embodiment provision is shown for telemetering only one current or voltage, for which purpose a telemeter-sender indicated at 40 keys output from oscillator 6B so as to send out pulses of oscillator energy at a pulse repetition frequency related to the amplitude of the quantity to be metered, ten pulses per second corresponding to zero meter deflection and forty pulses per second corresponding to full scale deflection. It is to be noted that these pulses are of single-frequency energy derived from oscillator 6B which is not used as a source of signal energy for any other metering or supervisory purpose. The pulsed output from telemeter-sender 40 is applied via terminal 36 through gating switch 37, together with the complex waves from commutator 36*a* for transmission to the master station as a modulation of the output of transmission 38.

In the present embodiment of the invention the master switching devices and the supervisory switching devices are of electronic pattern, each comprising a thermionic valve which is normally cathode-biassed beyond cut-off, and has control grids permanently coupled to respective ones of the oscillators whose output is to be switched. Operation of the appropriate master control device changes the cathode bias so as to render the valve conducting and thereby release energies of the oscillator frequencies at the anode circuit. It will be understood, of course, that in the case of the telemeter circuit-slave station switching devices, e. g. reference 40 in Fig. 2, only one control grid is used as such, since there is only one oscillator to switch. Obviously, however, other forms of switching device may be used, and electronic switching may be replaced by direct mechanical switching or by switching via relays or contactors.

Referring back to Fig. 1, energy radiated from the slave station is picked up on the directive receiving antenna system indicated at 41, and passed to receiver 42 in which it is amplified as necessary and then demodulated. The demodulated energy is applied to a selector 43 which passes only those components of the input which fall within the frequency band occupied by the oscillators 1B . . . 6B of the slave station, i. e. within the band 101 kc./s. to 151 kc./s. The output of selector 43 is then applied simultaneously to all of a group of six mixers 44, 45 . . . 49, each of which also receives input from a respective one of the six master station oscillators 1A, 2A . . . 6A, and has an output circuit arranged to respond only to the mixer products of 1 kc./s. beat frequency, the same as the already mentioned given amount of frequency difference between paired oscillators such as 1A and 1B.

The 1 kc./s. outputs from the five mixers 44 . . . 48 are applied, in combinations of two, to each of up to ten separately energised indicator devices, of which three are indicated at 50, 51, and 52. These indicator devices are adapted to operate in response to the two mixer 1 kc./s. signals which close respective slow-release relays whose contacts complete the energising circuits for supervisory lamps or other supervisory indicators (not shown) corresponding to the supervisory signals which control the slave switching devices illustrated at 33, 34, 35, on Fig. 2. It will be understood that while the indicator devices are themselves energised only intermittently, owing to the action of commutator switch 36 and gating switch 37 (Fig. 2), the release time of the slow-release relays is made sufficiently long to enable the supervisory lamp or other indicator to operate steadily in spite of the intermittent energisation of the indicator device per se.

The 1 kc./s. output from the remaining mixer (indicated at 49) consists of pulse trains corresponding to the keying control effected at the slave station by telemeter sender 40 (Fig. 2) and is applied to a telemeter receiver indicated at 53 (Fig. 1). The latter produces a direct current output which is proportional only to the rate of the pulses received, and is independent of pulse shape, mark-space ratio, amplitude (over a minimum), or any other factor. This direct current output is then fed to any suitable indicating instrument. Telemetering arrangements of this nature are already known in connection with supervisory equipment for electricity supply networks and railway electrification schemes.

Returning to Fig. 2, the gating switch 37 previously mentioned is introduced solely for the purpose of enabling the radar information to be transmitted from the remote radar equipment indicated at 54 to the master station location for display thereat. The gating switch is of electronic pattern and is time controlled over line 54*a* by the pulse source (not shown) forming part of the radar equipment itself; it operates in such fashion that for alternate intervals of 148 $\mu$ secs. it completes a path from terminal 36 to the transmitter 38 for the oscillator signals delivered over commutator switch 36 and over telemeter sender 40, while blocking any display pulse signals received from the radar equipment over line 55; during the intervening intervals, which are also of 148 $\mu$ secs. duration the oscillator signals are blocked, but the radar display pulse signals applied from radar equipment 54 to radar terminal 55 are passed on to frequency-modulate the transmitter 38. The interval-duration of 148 $\mu$ secs. is one-half the radar pulse transmission repetition period. The interval during which the radar display signals are blocked occupies that part of the radar pulse period corresponding to receipt of echoes which it is not necessary to display since they arrive from distances beyond the desired working range of the radar equipment.

It will be noticed that one effect of the gating switch 37 is to break up the signals from oscillators 1B . . . 6B into wave trains of duration 148 $\mu$ secs. This duration is sufficient to permit the passage of at least fourteen cycles per train, even at the lowest oscillator frequency, so that consecutive trains produce in the output circuits of each of the master station mixers 44 . . . 49 (Fig. 1) a series of pulses the envelope of which corresponds to the beat wave which would normally be obtained in the absence of interruption of transmission by the gating. Since these pulses occur at the rate of over 3000 per second, any strong 1 kc./s. component in the pulse envelope is able satisfactorily to excite the 1 kc./s. circuit of the mixture. Thus the gating switch does not interfere with the response at the master station to the supervisory and telemetering signals received from the slave station.

At the master station (Fig. 1), where the radar display equipment is located, the signals for application to the display equipment are obtained directly at the output of receiver 42, and are led to the display equipment indicated at 56, a 6 mc./s. rejector circuit 57 being interposed in the present case, to prevent interference from a telephone circuit which is superimposed on the radio link coupling the master and slave stations, and will be referred to hereinafter. It will be noted that no rejector circuit is required to cut out the supervisory and telemetering intermediate frequency signals, since these are already cut out by the gating switch 37 (Fig. 2) at those times when radar signals are being transmitted from the slave station, and at other times the display itself is blocked out locally since any echo signal which might have been received therein would be ineffective in the sense that they would arrive from distances beyond that desired.

While a control and supervisory equipment of the type so far described can be made to provide facilities normally sufficient to enable unattended operation of the remote equipment, it may at times be necessary to carry out special adjustments which involve the presence of an attendant at the remote equipment. In such circumstances, it is desirable to have telephone communication facilities available between the two stations. In the present instance, these facilities are obtained by providing at the slave station Fig. 2, a source 58 of sub-carrier oscillations of frequency 6 mc./s. (i. e. above the band required by the radar signals) adapted for amplitude modulation by speech signals from microphone circuit 59. The modulated sub-carrier oscillations are applied, together with the outputs from the master switching devices, to frequency-modulate the output of radio transmitter 38. At the master station Fig. 1 output from receiver 42 is fed to a 6 mc./s. sub-carrier demodulation 60, in which the sub-carrier is selected, amplified as necessary and then demodulated, the resultant speech signals being fed to the telephone receiver or other similar device indicated at 61. For communication in the reverse direction, input from microphone 62 is applied through amplifier 63 to frequency-modulate the output of radio transmitter 11. At the slave station Fig. 2, the speech output from receiver 14 is fed through low pass filter 64 to telephone receiver 65.

While the described specific embodiment comprises only six pairs of oscillators (1A . . . 6A, 1B . . . 6B) which provide for up to fifteen control functions in one direction and ten supervisory and one telemetering function in the reverse direction, it will be obvious that if necessary, still further functions can be obtained by adding extra pairs of oscillators, each new pair having the same predetermined 1 kc./s. frequency difference as the original pairs. If a large number of functions are to be represented, the complex waves may have frequency contents derived not from combinations of two but from combinations of three or more oscillators, thereby reducing the total number of pairs of oscillators required. Since the operation of the system depends on the production of beats of a definite frequency, the oscillators should be of the frequency-stabilised type, as for example, by crystal-control. The individual frequencies should, moreover, be so chosen that no two oscillators of different pairs will produce beats which are so close to the frequency of a third oscillator as to produce therewith a beat frequency sufficiently near to the predetermined 1 kc./s. difference between the frequencies of paired oscillators to produce a spurious actuation of a slave switching device. Preferably no oscillator frequency is a low-order harmonic of any of the other oscillator frequencies. Thus, in the case of a system using twelve pairs of oscillators, the frequencies at one of the stations might increase in 10 kc./s. steps from 100 kc./s. to 150 kc./s., and then, again in 10 kc./s. steps, from 165 kc./s. to 215 kc./s.

In certain cases it may be convenient to use more pairs of oscillators than are really necessary; for example, if thirty complex waves are required, these may be obtained from twelve pairs of oscillators, of frequencies as set out in the previous paragraph, operated not as a single group with a capacity of sixty-six complex waves, but as two groups each giving fifteen complex waves, one group covering the range 100 kc./s. to 150 kc./s., the other group covering the range 165 kc./s. to 215 kc./s. The controls associated with each group may be correspondingly grouped, and the two groups of controls operated entirely independently.

While the hereinbefore described embodiment of the invention includes radio link means for communication between master and slave stations, it will be appreciated that any transmission system capable of carrying the required band width may be used. In the present instance, the band width is of the order of 6 to 7 mc./s. and is governed mainly by the radar signals, which are in the form of pulses of duration 0.2$\mu$ sec. For sufficiently short distances radio transmission might be replaced if convenient by direct transmission over a wave guide or transmission line, even for band widths of several megacycles. For cases in which it is only required to transmit the signals used by the control and supervisory system proper i. e. the switched or keyed outputs of the paired oscillators, with a band width well below a megacycle, these signals may be transmitted over any suitable wire or cable system which may be available.

While the principles of the invention have been described above in connection with specific embodiments, and particular modifications thereof, it is to be clearly understood that this description is made by way of example and not as a limitation on the scope of the invention.

What I claim is:

1. An electrical remote control and supervisory system comprising a master station and a slave station adapted for linkage by signal transmission means, a first group of oscillators at such master station, each operating at a different frequency, a second group of oscillators at said slave station corresponding to the oscillators at said master station, each operating at a frequency different from the frequency at its corresponding oscillator in said first group, the frequency difference between said oscillator pairs being identical, separate means at both of said stations for selectively combining the outputs of at least two oscillators in each of said groups to derive therefrom, respectively, a plurality of sources of signal energy for transmission over said transmission means from one of said stations and a plurality of sources of beating signal energy at the other of said stations, separate means at both said stations for selectively coupling said oscillators to said transmission means, said last-mentioned selective coupling means at said slave station comprising commutator means adapted to apply commutatively to said transmission means the switched signal energy from each of said plurality of oscillators in turn in regular cyclical succession, a plurality of utilization devices, and a plurality of separate control means respectively coupled between said coupling means and said utilization devices for controlling operation from one of said stations of selected ones of said utilization devices at the other of said stations in response to said signal energies.

2. An electrical remote control and supervisory system as claimed in claim 1, wherein said commutator means further comprises a radar apparatus and a gate circuit coupled between said radar apparatus and said transmission means, said gate circuit under control of pulses from said radar apparatus and adapted to alternately block transmission of signal energy from said second plurality of oscillators over said transmission means during pulse-off periods of said radar apparatus, whereby radar display signals from said apparatus may be applied to said transmission means during said pulse-off periods.

3. An electrical remote control and supervisory system as claimed in claim 2, further comprising radar display means at said master station and means to selectively apply said radar display signals to said display means during said pulse-off periods.

References Cited in the file of this patent

UNITED STATES PATENTS

| | | |
|---|---|---|
| 2,235,768 | Luck | Mar. 18, 1941 |
| 2,424,243 | Lowell | July 22, 1947 |
| 2,449,391 | Kogane | Sept. 14, 1948 |
| 2,459,482 | Bond | Jan. 18, 1949 |
| 2,519,935 | Smith et al. | Aug. 22, 1950 |
| 2,522,893 | Purington | Sept. 19, 1950 |
| 2,539,014 | Frantz | Jan. 23, 1951 |
| 2,547,945 | Jenks | Apr. 10, 1951 |
| 2,552,172 | Hawes | May 8, 1951 |
| 2,580,453 | Murray et al. | Jan. 1, 1952 |
| 2,599,097 | Entz et al. | June 3, 1952 |